United States Patent Office 3,489,771
Patented Jan. 13, 1970

3,489,771
PROCESS FOR THE PREPARATION OF
IMINO-DITHIOLANES
Alain Donche and Claude Thibault, Pau, France, assignors to Societe Nationale des Petroles d'Aquitaine, Courbevoie, France
No Drawing. Filed Dec. 1, 1967, Ser. No. 687,148
Claims priority, application France, Dec. 5, 1966, 86,109; Dec. 6, 1966, 86,256
Int. Cl. C07d 71/00, 91/16; C08c 11/60
U.S. Cl. 260—327
9 Claims

ABSTRACT OF THE DISCLOSURE

Imino-dithiolanes, the nitrogen atom of which bears a hydrocarbyl radical, are prepared by heating enthylene-monothio-carbonate with the isothiocyanate of a hydrocarbyl radical or with a thiourea which has one or two substitutions constituted by hydrocarbyl radicals, the radicals being such as alkyls, aryls, aralkyls or cycloalkyls. Imino-thiazolidines are obtained in a smiliar way.

---

The present invention relates to the preparation of dithiolanes carrying hydrocarbyl substituents on the nitrogen and, in particular, hydrocarbyl-substituted 2-imino-1,3-dithiolanes. According to one aspect thereof, the invention is also concerned with obtaining substituted thiazolidines, in addition to the substituted dithiolanes.

Dithiolanes are heterocyclic compounds containing two sulphur atoms in a ring having 5 elements, while in thiazolidines, one of the sulphur atoms of the nucleus is replaced by a nitrogen atom; these substances are useful as sulphurising agents, for example, for the progressive and controlled sulphurisation of metals or other materials.

A substituted dithiolane can be prepared by the action of N-phenyl-imino-phosgene on ethane dithiol in a basic medium, which leads to 2-imino-phenyl-1,3-dithiolane, with a yield of the order of 48% (V. S. Etlis et al.—J. Gen. Chem. USSR 1964, 34, 4076–79). However, this method of preparation makes use of reactants which have to be prepared beforehand in a relatively costly manner; thus N-phenyl-imino-phosgene can be prepared by the chlorination of phenyl isocyanate, but this involves substantial losses; likewise, ethane dithiol is not a readily available starting material, and it has to be produced at a not inconsiderable expense.

The present invention enables the above-mentioned difficulties to be avoided; it provides a simple process which can be carried out industrially with yields almost as good as those which have been possible hitherto, but which is much more economical, as it starts with initial materials which can be obtained much more easily.

The process according to the invention consists in causing ethylene monothiocarbonate to react with an organic isothiocyanate or a mono-substituted or disubstituted thiourea.

The reactions which take place can be represented as follows:

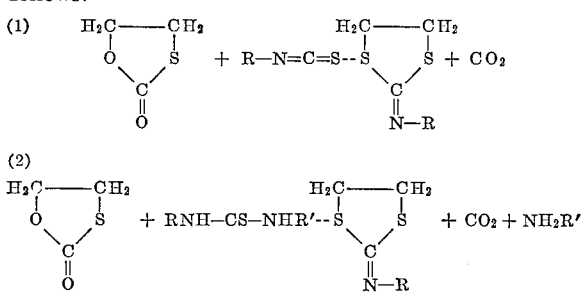

in which R represents a hydrocarbyl group, such as an alkyl, aryl, cycloalkyl or aralkyl group, while R' can also be such a group, which may be the same as or different from R, or a hydrogen atom.

The similarity of the reactions which take place with isothiocyanates and with thioureas can be explained by the fact that thiourea is an isomer of ammonium isothiocyanate, while the substituted ureas are isomers of the corresponding amine isothiocyanates.

In carrying the process of the invention into effect, it is generally found that a certain proportion of a thiazolidinethione of the formula:

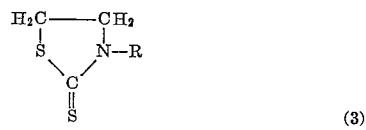

is formed, which can be easily separated from the reaction medium. Under certain working conditions, there may be also formed an imino-thiazolidine of the formula:

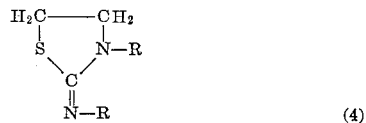

When the reactant being used is a disubstituted thiourea, that is to say, when R' is other than H, there is also obtained a substantial proportion of an imino-thiazolidine substituted on the nitrogen, of the formula:

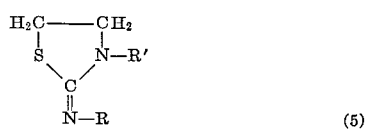

in which R and R', which may be the same or different, have the same meaning as above, except that R' does not represent hydrogen.

Moreover, these thiazolidine-thiones are themselves useful industrially, particularly as accelerators for the vulcanisation of rubbers.

The process according to the invention can be carried out at temperatures of about 120° to 250° C. It can be accelerated by means of catalysts, in which case the preferred temperatures are of the order of 150° to 210° C.

With the isothiocyanate, it is preferable to use a catalyst, the most suitable temperature range then being from 180° to 210° C. On the other hand, catalysts are of no value if the reactant chosen is a substituted thiourea, in which case the most suitable temperature range is between 150° and 200° C., and the preparation can take place in a time which is of the order of 10 to 60 minutes.

As catalysts, alkali metal salts, and preferably those which are basic, are particularly suitable, as well as organic bases, particularly amines, urea and thiourea, for example, all of which may be substituted. As non-limiting examples, it is possible to employ chlorides, particularly lithium chloride, and better still, alkali metal carbonates.

As indicated above, the reactant R—N=C=S is constituted by one or more isothiocyanates of R, and this leads to 2-R-imino-1,3-dithiolane being obtained in accordance with the reactant (1), accompanied by a certain proportion of 2-R-1,3-thiazolidine-2-thione, according to Formula 3, and possibly 3-R-2-R-imino-1,3-thiazolidine, according to Formula 4. The separation of these compounds does not present any difficulty; it can be carried out by distillation under reduced pressure, by recrystallisation, and/or optionally by filtration on an absorbent earth.

Branched or linear alkyl isothiocyanates, for example those in which the number of carbon atoms is from 1 to 30, are suitable for carrying out the invention; in particular, it is possible to use alkyl isothiocyanates having from 1 to 6 carbon atoms; thus, it is possible with advantage to use methyl, ethyl, propyl, butyl, isobutyl, tert.-butyl, pentyl, hexyl and octyl isothiocyanates for example. As regards the aryl isothiocyanates, their aromatic (and particularly benzene) nucleus or other nucleus can carry electro-positive or electro-negative substituents, such as for example, alkyl radicals such as methyl, ethyl, hexyl and dodecyl for instance, and also halogen, in particular chlorine, and such groups as nitro and sulpho. The process of the invention can be carried out with, in particular, phenyl, methyl-phenyl, dimethyl-phenyl, ethyl-phenyl, butyl-phenyl, decyl-phenyl and naphthyl isocyanates. Cycloalkyl isothiocyanates can likewise be used, particularly cyclopentyl and cyclohexyl isocyanates, in which the cycloalkyl group may possibly be substituted.

As to the thioureas, those with branched or linear alkyl substituents are suitable for carrying out the invention, for example, those in which the number of carbon atoms is from 1 to 30; in particular, it is possible to use monoalkyl or dialkyl thioureas in which the alkyl radical(s) contains or contain 1 to 6 carbon atoms, particularly methyl, ethyl, propyl, butyl, isobutyl, tert-butyl, pentyl and hexyl, for example. As regards aryl thioureas, the aromatic nucleus, which may be a benzene or other nucleus, can carry electro-positive or electro-negative substituents, such as for example, alkyl radicals such as methyl, ethyl, hexyl and dodecyl for instance, and also halogens, in particular chlorine, and such groups as nitro and sulpho. It is also possible to use cycloalkyl-substituted thioureas, such as cyclopentyl and cyclohexyl thioureas, in which the cycloalkyl group may possibly be substituted.

The yield of dithiolane in accordance with reaction (2) is higher when the thiourea used is mono-substituted, that is to say, when R′ is a hydrogen atom.

The invention is illustrated in a non-limitative manner by the following examples.

Example 1

A mixture of 20.8 g. of ethyl monothiocarbonate, i.e. 0.2 mol with 27 g. of phenyl isothiocyanate, i.e. 0.2 mol, and 0.042 g. of lithium chloride (0.001 mol) is brought to 180° C. and kept at this temperature for 8 hours. The crude product resulting from this heating is filtered twice through 100 g. of aluminium oxide, using benzene as extraction agent. By the addition of petroleum ether to the solution thus obtained, 2.5 g. of 3-phenyl-2-imino-phenyl-1,3-thiazolidine are precipitated and separated, that is to say, the substance of the Formula 4, in which R is phenyl; the substance melts at 135° C. The solvent is then driven off and the remaining product is distilled; after being fractionated twice, there is obtained 11 g. of 2-iminophenyl-1,3-dithiolane, that is to say, the end-product of reaction (1), in which R is phenyl; this dithiolane melts at 45° C. In addition, the fractionation gives 6 g. of 3-phenyl-1,3-thiazolidine-2-thione of the Formula 3, in which R is phenyl. In this preparation, the yield of dithiolane was 28%, the yield of thiazolidine-thione was 15% and the yield of imino-phenyl thiazolidine was 5%, that is to say, altogether a yield of 48% of useful products.

Example 2

The operations of Example 1 were repeated, but the heating took place for 2 hours only, at 200° C.; the results were the same as in Example 1.

Example 3

A mixture of 62.4 g. (0.6 mol) of ethylene monothiocarbonate with 81 g. (0.6 mol) of phenyl isothiocyanate and 0.3 g. of sodium carbonate is heated at 200° C. for 15 minutes. Separation by distillation, carried out as in Example 1, yields:

27.5 g. of isothiocyanate which has not reacted, i.e. 34%, 47.6 g. of the same dithiolane as in Example 1, i.e. a yield of 41%, 11 g. of 3-phenyl-1,3-thiazolidine-2-thione, i.e. a yield of 9%.

The presence of imino-phenyl thiazolidine is not established.

Example 4

Heating is carried out as in Example 3, but instead of filtering through aluminium oxide, the crude product is dissolved in 250 ml. of ether and washed twice with 50 ml. of 50% hydrochloric acid. The ethereal phase is concentrated and distilled. There are then obtained:

25.5 g. of the initial isothiocyanate which has not reacted, and
10.6 g. of 3-phenyl-1,3-thiazolidine-2-thione.

The aqueous phase is treated while cold with 20% sodium hydroxide solution until it becomes alkaline, after which the 2-imino-phenyl-1,3-dithiolane is extracted with ether; after drying, evaporation of the solvent and distillation, 45 g. thereof are collected, that is to say, a yield of 38%. There is no formation of imino-phenyl thiazolidine.

Example 5

A mixture of 0.2 mol of diphenyl thiourea (45.6 g.) with 0.25 mol of ethylene monothiocarbonate (26 g.) is heated at 160°–170° C. for 20 minutes. The crude product obtained is filtered twice through 100 g. of aluminium oxide, using benzene as the extraction agent. By the addition of petroleum ether, there is precipitated and separated, 3-phenyl-2-imino-phenyl-1,3-thiazolidine of Formula 3, which is present in the mixture. After evaporation of the solvent, there is distilled 2-iminophenyl-1,3-dithiolane, melting at 45° C., obtained by reaction (1). Fractionation of the residue yields 3-phenyl-1,3-thiazolidine-2-thione of Formula 2, which has been formed at the same time as the dithiolane. The yields of the three above-mentioned compounds, with respect to the thiourea used, are thus:

23% of 2-iminophenyl-1,3-dithiolane,
26% of 3-phenyl-1,3-thiazolidine-2-thione, and
13% of 3-phenyl-2-iminophenyl-1,3-thiazolidine, that is, a total of 62% of useful compounds.

Example 6

In a procedure similar to that of Example 5, diphenyl thiourea was replaced by 0.2 mol (30.4 g.) of monophenyl thiourea. The yield of 2-iminophenyl-1,3-dithiolane was then higher (35%), that of 3-phenyl-1,3-thiazolidine-2-thione was lowered to 13%, while there was practically no yield of 3-phenyl-2-iminophenyl-1,3-thiazolidine.

The foregoing examples show that dithiolane can be prepared from readily available and inexpensive starting materials, namely organic isothiocyanates (or substituted thioureas) and ethylene monothiocarbonate, by contrast with the phenyl-iminophosgene and ethane dithiol which had to be used hitherto.

The examples also show that using an alkaline salt, in particular sodium carbonate, as a catalyst, the reaction is much faster than with a halide such as, in particular, lithium chloride; this is apparent from comparing Examples 1 or 2 with 3 or 4. Moreover, during the rapid preparation with the alkaline catalyst, the iminated derivative of the thiazolidine of Formula 4 is not formed at the same time as the dithiolane.

On the other hand, it will be seen that when using substituted thioureas instead of isothiocyanates, it is possible to obtain even higher yields without the use of catalysts.

The following examples show certain uses of the compounds above described.

Example 7

Nickel catalyst for the hydrogenation of dienes was prepared according to the French Patent No. 1,348,913 granted to the British Petroleum Company Limited on Dec. 2, 1963, but the thiophene and the thiacyclopentane, used according to the patent, were replaced by equivalent amounts of the 2-imino-phenyl-1,3-dithiolane prepared in the above Example 1. The procedure applied was that described in the Patent No. 1,348,913. The tests of activity, with isoprene at 100° C., of the catalyst sulfurized with 2-iminophenyl-1,3-dithiolane gave the following results:

Test No. 33 (Table I of the cited patent)—97.8% of monoethylenic hydrocarbon, as compared with 95.9% with thiophene;

Test No. 38 (Table I of the cited patent)—99.2%

Test No. 56 (Table I of the cited patent)—90.1%

(instead of 86.2% with thiacyclopentane).

Example 8

In the tests of Example 7 the dithiolane being replaced with 3-phenyl-1,3-thiazolidine-2-thione, respective results were:

| Test No.: | Percent |
|---|---|
| 33 | 98.1 |
| 38 | 98.8 |
| 56 | 90.3 |

We claim:

1. Method of preparing an imino-dithiolane the nitrogen atom of which bears a hydrocarbyl radical, which consists in heating at a temperature in the range of 120° to 250° C. ethylene monothiocarbonate with a compound selected from the group which consists of isothiocyanates of hydrocarbyl radicals, thiourea substituted with one hydrocarbyl radical and thiourea substituted with two hydrocarbyl radicals, said radicals having 1 to 30 carbon atoms.

2. Method according to claim 1, wherein said radicals are alkyls having 1 to 6 carbon atoms.

3. Method according to claim 1, wherein said radicals are phenyls.

4. Method according to claim 1, wherein said radicals are cycloalkyls having 5 to 6 carbon atoms.

5. Method according to claim 1, wherein the reactants are in stoichiometric proportions.

6. The method according to claim 1, wherein the reaction between ethylene monothiocarbonate and the isothiocyanate is effected in the presence of a catalyst selected from the group consisting of an alkali metal chloride and an alkali metal carbonate.

7. Method according to claim 6, wherein said catalyst is lithium chloride.

8. Method of preparing 2-iminophenyl-1,3-dithiolane, which consists in heating at 150° to 210° C., a mixture of one mole of phenylisothiocyanate, one mole of ethylene-monothiocarbonate and a catalytical amount of a catalyst selected from the group which consists of lithium chloride and sodium carbonate, for 2 to 8 hours, and then separating the 2-iminophenyl-1,3-dithiolane produced from the 3-phenyl-2-imino-phenyl-1,3-thiazolidine and the 3-phenyl-1,3-thiazolidine-2-thione which are also formed.

9. Method of preparing 2-iminophenyl-1,3-dithiolane, which consists in heating at 150° to 210° C., a mixture of one mole of ethylene-monothiocarbonate with one mole of a compound selected from the group consisting of monophenyl-thiourea and diphenyl-thiourea, until a substantial amount of 2-imino-phenyl-1,3-dithiolane is formed, and then separating the 2-iminophenyl-1,3-dithiolane from the mixture obtained.

References Cited

UNITED STATES PATENTS 3,364,230  1/1968  Addor _____ 260—327

JAMES A. PATTEN, Primary Examiner

U.S. Cl. X.R.

252—430, 439; 260—306.7, 683.9, 685, 788